United States Patent
Albuquerque Moraes et al.

(10) Patent No.: US 6,208,836 B1
(45) Date of Patent: Mar. 27, 2001

(54) EARTH STATION ACQUISITION SYSTEM FOR SATELLITE COMMUNICATIONS

(75) Inventors: Jose Luiz Albuquerque Moraes, Middlesex; Sze-Ching Lu, Surrey, both of (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 08/915,908

(22) Filed: Aug. 21, 1997

(30) Foreign Application Priority Data

Aug. 24, 1996 (GB) .................................................. 9617777

(51) Int. Cl.⁷ ...................................................... H04Q 7/20
(52) U.S. Cl. ...................... 455/13.1; 455/427; 455/428; 455/430; 455/432
(58) Field of Search ..................................... 455/427, 430, 455/12.1, 13.1, 525, 456, 433, 450, 451, 452, 428, 432

(56) References Cited

U.S. PATENT DOCUMENTS

| | | | | |
|---|---|---|---|---|
| 5,528,247 | * | 6/1996 | Nonami | 455/427 X |
| 5,655,005 | * | 8/1997 | Wiedeman et al. | 455/13.1 |
| 5,758,261 | * | 5/1998 | Wiedwman | 455/427 X |
| 5,797,097 | * | 8/1998 | Roach, Jr. et al. | 455/456 |
| 5,812,932 | * | 9/1998 | Wiedeman et al. | 455/13.1 X |

FOREIGN PATENT DOCUMENTS

| | | | |
|---|---|---|---|
| 0536921 | 4/1993 | (EP) . | |
| 2275588 | 8/1994 | (GB) . | |
| 2281014 | * 2/1995 | (GB) | H04Q/7/20 |
| 2295296 | 5/1996 | (GB) . | |
| WO96/16488 | 5/1996 | (WO) . | |

* cited by examiner

Primary Examiner—Thanh Cong Le
Assistant Examiner—Yemane Woldetatios
(74) Attorney, Agent, or Firm—McDermott, Will & Emery

(57) ABSTRACT

In a satellite communication system where user terminals 11 communicate via satellites 9A–E with earth stations 7A–E to join with a terrestrial telephone network 1, a controller 18 at a master earth station 7A monitors all earth stations 7A–E for a request for service received from a user terminal 11, then calculates which earth station 7A–E is best placed to service the request and instructs the best placed earth station 7B to service the request. In servicing the request, the best placed earth station 7B uses that earth station 5C whereat the user terminal 11 is registered as a visitor as the gateway into the terrestrial system 1 by routing all voice grade messages thereto and therefrom via a voice link 21. If the user terminal 11 is not registered at any earth station 7A–E, the best placed earth station becomes the earth station of registration and acts as a gateway. The user terminal can store the identity of the last earth station 7A–E whereat it was registered and can inform the controller 18 for direct use of that information.

25 Claims, 5 Drawing Sheets

EARTH STATION ACQUISITION SYSTEM FOR SATELLITE COMMUNICATIONS

FIELD OF THE INVENTION

The present invention relates to a telecommunication system where remote user terminals are in receipt of access to a larger telecommunication system by means of direct access to a satellite which, in turn, is in communication with an earth station. It particularly relates to a system where, potentially, a user terminal can access more than one satellite and where, via a satellite or satellites, can access more than one earth station.

BACKGROUND

First, it is necessary to describe the general terrestrial telephone system. This is the "larger telecommunication system" mentioned above.

The terrestrial telephone system comprises the sum of all of the wire, optical, point-to-point microwave and any other means of conducting signals from one point to another via the surface of the earth, together with their associated switches, amplifiers, encoders, decoders, amplifiers and repeaters. On a national level, the network links all access points in a country. Country is linked to country via international trunk lines. Oceans are spanned by submarine cables. The terrestrial network is a transparent carrier where a signal may be introduced from an access point and routed to another, selected access point elsewhere on the surface of the earth. A subscriber can access the terrestrial system via various gateways. For example, the terrestrial system can be accessed from the public switched telephone network, a public switched data network, an integrated switched digital network, a cellular telephone system, or a satellite telephone system. Each gateway provides a plurality of different access points, which, depending upon the gateway, can range from a simple telephone to a complex data or image source. The subscriber's gateway, at the subscriber's request, commands the terrestrial system to route and carry the message from the subscriber to a selected destination. The message comes in through the subscriber's gateway, passes through the terrestrial system, and exits through the selected destination gateway to reach the access point required. Once the message path is established, two-way communication can commence. This is the way the terrestrial system works. Each gateway is connected to another single gateway. The terrestrial system is not adapted, readily, to switch, during the course of a message, between different source gateways or between different destination gateways.

Each gateway, in what is generally understood to be a telephone system, provides a plurality of access points whereby a subscriber may make or receive calls. Each access point is unique in its identify or location and definitely is unique to its particular gateway. In other words, one access point means one gateway.

Now, satellite systems provide a gateway to the terrestrial system via earth stations, capable of establishing two way contact with a satellite or satellites. In turn, the satellites can communicate with user terminals (portable handsets). The user terminals are thus put in contact with the earth stations which can act as a gateway to the terrestrial system.

Sadly, each earth station is a separate gateway. Generally, the earth stations are widely spread apart. The present invention imagines an earth station density of one, two or just a few earth stations on each continent. Thus, in general, each user terminal will see satellites which are visible only to one earth station. This satisfies the terrestrial network requirement "one access point means just one gateway", This situation is not a problem. However, there a circumstances, for example, in the middle of the pacific ocean, in the middle of the Sahara Desert, High atop the Andes, where a user terminal may be able to see a satellite or satellites which, in turn, are visible to more than one earth station. This now breaks the rule "one access point means just one gateway". The user terminal is an access point. Each earth station is a gateway. Now there is the situation "one access point-many gateways". The terrestrial network is not adapted to respond to multiple gateways. Further, the signals to and from the earth station, satellites and user terminals are forever changing. What was a perfectly good satellite link a moment ago is no longer functional because the satellite has moved, the user terminal has been shielded by a building or other structure, and a host of other reasons. However, one of the other user terminal to satellite to earth station links might still work. How can the switch between earth stations be effected without confusing the operation of the terrestrial network? In particular, how can a call be established between a user terminal and the terrestrial system using the intervening medium of plural satellites and plural earth stations? The present invention seeks to provide a system and a method whereby a user terminal may gain access to the terrestrial system through a single earth station gateway even though alternative earth stations may have to be employed for contact with the user terminal.

SUMMARY OF THE INVENTION

According to one aspect, the present invention consists in a satellite communication system where a user terminal is operative to communicate with each of a plurality of satellites; where each of said plurality of satellites is operative to communicate with each of a plurality of earth stations; where said user terminal is operative to communicate through said plurality of satellites to request service; where said plurality of earth stations comprises a controller; where each of said plurality of earth stations is operative to monitor said satellites, and, in the event of receiving a request for service from said user terminal, is operative to signal said controller, indicatively of having received a request for service from said user terminal; and where said controller is operative, in response to said signal indicative of having received a request for service from said user terminal, to instruct the best placed one out of said plurality of earth stations to service said request.

The first aspect of the present invention further provides a satellite communication system wherein said controller is operative to calculate the position of said user terminal and is operative to select said best placed earth station on the basis of the position of the user terminal, the instant and future positions of the satellites, and the positions of the earth stations.

The first aspect of the present invention yet further provides a satellite communication system wherein said user terminal is operative to request service on a random access channel and wherein each of said earth stations is operative to respond to a request for service on said random access channel.

The first aspect of the present invention yet further provides a satellite communication system wherein said best placed earth station is operative, in response to instruction from said controller, to allocate a frequency for a communication channel for use by said user terminal.

The first aspect of the present invention yet further provides a satellite communication system wherein said controller is operative to instruct said best placed earth station to inform said user terminal of the frequency of said allocated communication channel and wherein said user terminal is operative, in response to said being informed by said best placed earth station to retune to said frequency of said allocated communication channel to communicate with said best placed earth station.

The first aspect of the present invention yet further provides a satellite communication system wherein said user terminal is operative to store the identity of that earth station whereat said user terminal was last registered, and wherein said user terminal is operative to convey said identity to said controller.

The first aspect of the present invention further provides a satellite communication system wherein said controller is operative to command each of said earth stations to inspect the contents of a respective visitor location register to determine whether or not said user terminal is registered thereon, and to signal back to said controller whether or not said user terminal is registered.

The first aspect of the present invention further provides a satellite communication system wherein, when said user terminal is registered at one of said earth stations as a gateway station into a terrestrial telephone system, in the event that said best placed earth station is not said gateway station, said controller is operative to instruct said best placed earth station to relay all voice messages to and from said terrestrial system via said gateway earth station.

The first aspect of the present invention yet further provides a satellite communication system wherein, when said user terminal is not registered at any of said earth stations as a gateway earth station, said controller is operative to instruct said best placed earth station to become the registered gateway earth station for said user terminal.

The first aspect of the present invention further provides a satellite communication system wherein said relaying of messages between said gateway earth station and said best placed earth station is accomplished using a voice grade link.

The first aspect of the present invention further provides a satellite communication system wherein said instructions and data are conveyed between said controller and said earth stations, and between said earth stations, using a low capacity digital link.

The first aspect of the present invention also provides a satellite communication system wherein said controller is combined with one out of said plurality of earth stations to provide a master earth station.

According to a second aspect, the present invention consists in a method for use in a satellite communication system where a user terminal is operative to communicate with each of a plurality of satellites; where each of said plurality of satellites is operative to communicate with each of a plurality of earth stations; where said user terminal is operative to communicate through said plurality of satellites to request service; where said plurality of earth stations comprises a controller; said method including the steps of: each of said plurality of earth stations monitoring said satellites; each of said plurality of earth stations, in the event of receiving a request for service from said user terminal, signalling said controller, indicatively of having received a request for service from said user terminal; and said controller, in response to said receipt of a signal indicative of having received a request for service from said user terminal, instructing the best placed one out of said plurality of earth stations to service said request.

The second aspect of the present invention further provides a method including the steps of: said controller calculating the position of said user terminal; and said controller selecting said best placed earth station on the basis of the instant position of the user terminal, the instant and future positions of the satellites, and the positions of the earth stations.

The second aspect of the present invention further provides a method including the steps of; said user terminal requesting service on a random access channel; and each of said earth stations, in receipt of a request for service from said user terminal responding thereto.

The second aspect of the present invention further provides a method including the steps of said best placed earth station, in response to instruction from said controller, allocating a frequency for a communication channel for use by said user terminal.

The second aspect of the present invention further provides a method including the steps of; said controller instructing said best placed earth station to inform said user terminal of the frequency of said allocated communication channel; and said user terminal, in response to said being informed by said best placed earth station of the frequency of said communication channel, to retaining to said frequency of said allocated communication channel to communicate with said best placed earth station.

The second aspect of the present invention further provides a method including the steps of: said user terminal storing the identity of that earth station whereat said user terminal was last registered, and said user terminal conveying said identity to said controller.

The second aspect of the present invention further provides a method including the steps of said controller commanding each of said earth stations to inspect the contents of a respective visitor location register to determine whether or not said user terminal is registered thereon, and each of said earth stations signalling back to said controller whether or not said user terminal is registered.

The second aspect of the present invention further provides a method including the steps of said controller, in the event of said user terminal being registered at one of said earth stations as a gateway station into a terrestrial telephone system, and in the event that said best placed earth station is not said gateway station, instructing said best placed earth station to relay all voice messages to and from said terrestrial system via said gateway earth station.

The second aspect of the present invention further provides a method including the step of said controller, in the event that said user terminal is not registered at any of said earth stations as a gateway earth station, instructing said best placed earth station to become the registered gateway earth station for said user terminal.

The second aspect of the present invention further provides a method including the step of employing a voice link to relay said messages between said gateway earth station and said best placed earth station.

The second aspect of the present invention further provides a method including the step of conveying said instructions between said controller and said earth stations, and between said earth stations, using a low capacity digital link.

The second aspect of the present invention further provides a method including the step of incorporating said controller with one out of said plurality of earth stations to provide a master earth station.

According to a third aspect, the present invention consists in a user terminal for use in a satellite communication system where said user terminal is operative to communicate with each of a plurality of satellites; where each of said plurality of satellites is operative to communicate with each of a plurality of earth stations; where said user terminal is operative to communicate through said plurality of satellites to request service; where said plurality of earth stations comprises a controller; where each of said plurality of earth stations is operative to monitor said satellites, and, in the event of receiving a request for service from said user terminal, is operative to signal said controller, indicatively of having received a request for service from said user terminal; and where said controller is operative, in response to said signal indicative of having received a request for service from said user terminal, to instruct the best placed one out of said plurality of earth stations to service said request; said user terminal being characterised by being operative to store the identity of that earth station whereat said user terminal was last registered and to convey said identity to said controller and is further operative, in the event of said user terminal not storing an identity, to accept, as said identity, the identity of said best placed earth station.

In the preferred embodiment, each earth station comprises, for preference, a supervisory mobile satellite switching centre which controls the interaction between the individual earth station and the mobile user terminals and which can provide switching into and out of the terrestrial system. The controller, for preference, is attached to one of the mobile satellite switching centres to modify its behaviour so that it becomes a master earth station. The user terminal comprises a register for storing the identity of the earth station whereat it is registered. When required so to do, the user terminal informs the controller, either directly through the master earth station or indirectly via another earth station, of the identity of that earth station where it is registered so that its gateway into the terrestrial system can be identified.

In the preferred embodiment, the user terminal sends a request for service on a random access channel, which is picked by any satellites within range which, in turn, relay the request to each of those earth stations with which they are in contact. The request-receiving earth stations relay the fact of the request to the controller at the master earth station which works out which of the earth stations is best placed to service the request from the user terminal and instructs that best placed earth station to service the request. If the user terminal is registered at any earth station which acts as the gateway into the terrestrial system, voice grade message contact is established between the best placed earth station and the gateway earth station so that the original gateway is all that is seen by the terrestrial system. If the user terminal is not registered at any earth station, the best placed earth station becomes the station of registration to act as gateway into the terrestrial system.

When the request for service has been met, the entire system resets to its original mode (with the exception of any possible new registration of the user terminal at one of the earth stations). On subsequent request for service, the whole operation starts over again, with reference being made to the controller at the master earth station for direction as to which earth station should handle the request.

BRIEF DESCRIPTION OF THE DRAWINGS

The present invention is further explained, by way of an example, by the following description, read in conjunction with the appended drawings, in which.

DESCRIPTION OF EMBODIMENTS

Figure 1:
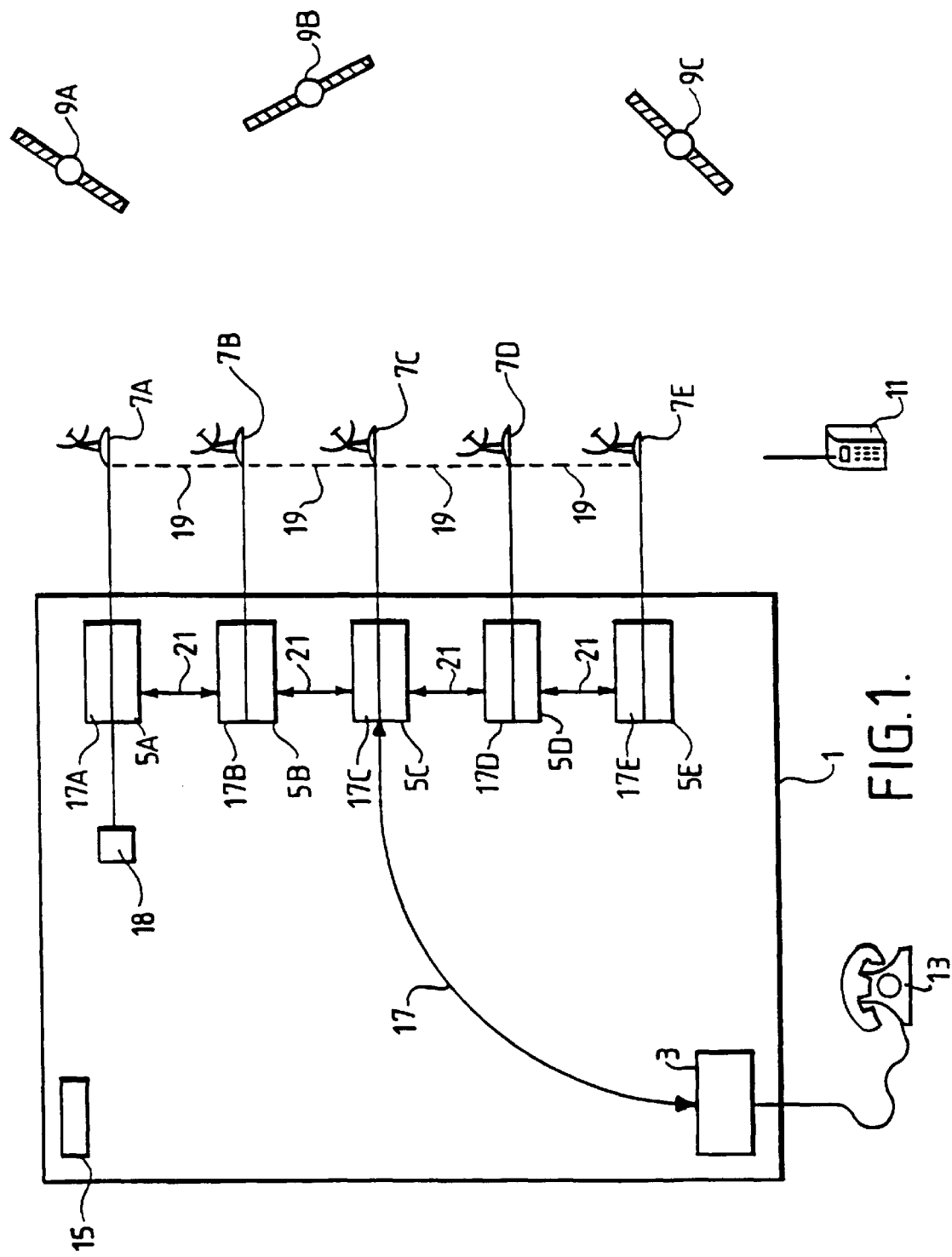
FIG. 1 is a highly schematised representation of the global communications system within which the present invention is comprised.

Attention is drawn to FIG. 1. The terrestrial system 1 comprises a plurality of gateways 3 which may be individual national public or cellular telephone systems, public switched data networks, public land mobile systems, other satellite system, and so on. Included in the gateways are a number of mobile satellite switching centres 5A 5B 5C 5D 5E. Each mobile satellite switching centre 5A–E is uniquely connected to one, and only one, earth station 7A 7B 7C 7D. The earth stations 7A–E are scattered about the world. They are designed to interact with a constellation of satellites 9A 9B 9C, in two orthogonal orbits, with ten operational satellites in each orbit with two spares, each orbit at 45 degrees to the equator and at a height of 10,500 Km from the surface of the earth. This is only an example of one satellite system with which the present invention would work. As will become apparent to those skilled in the art upon reading the following description and claims, the invention is applicable to virtually any satellite system where a multiple earth station problem arises.

Each of the earth stations 7A–E can communicate with any of the satellites 9A–C which may be within its line of sight. At any one time, different satellites 9A–C may be in the line of sight of different earth stations 7A–E. Some satellites 9A–E may be visible to more than one earth station 7A–E.

A user terminal 11, otherwise unconnected to the terrestrial system 1 because it is remote or does not have the ability so to connect, is able to exchange radio signals with any of the satellites 9A–C which may be in its line of sight and sufficiently elevated above the horizon for communication to be established and maintained. The user terminal 11 is generally in the form of a portable radio telephone handset, not unlike a cellular radio telephone handset, but adapted to function with satellites 9A–C. Now, a satellite 9A–C, visible to the user terminal 11, may, in turn, be visible to more than one earth station 7A–E. Likewise, more than one satellite 9A–C may simultaneously be visible to the user terminal 11 so that a user terminal 11, potentially, may be in simultaneous contact with multiple earth stations 5A–5E.

When a subscriber 13 wishes to call the user terminal 11 the terrestrial system 1, recognising the unique identifier of the user terminal 11, is referred to a home location register 15, located within the terrestrial system 1. The home location register 15 is the normal register whereat the details of the user terminals 11 are stored, and may, physically, be located proximate to the point where the user terminal 11 is generally located. For the purpose of this example, it is assumed that the user terminal 11 has moved, and is no longer in its usual location.

At some point, the user terminal 11 has logged on to a satellite and has thus engaged one of the Mobile satellite switching centres 5A 5B 5C 5D. This is its visitor location. Each Mobile satellite switching centre 5A–E comprises a corresponding visitor location register 17A–E. When the User terminal 11 logged on to the terrestrial system 1 via the earth station 7A–E to which it selected access and, in turn, onto its corresponding gateway, which, in this instance, is the related Mobile satellite switching centre 5A–E, a message is sent through the terrestrial system 1 so that the identity of the particular gateway 5A–E wherethrough the user terminal 11 might be found, is stored in the home location register 15. When the subscriber 13 attempts to call the user terminal 11, reference is first made to the home location register 15. The home location register 15 now holds the identity of the gateway 5A–E wherethrough the user terminal 11 is to be found. The audio signal, from the subscriber and via the subscriber's gateway 3, is routed directly to the visitor location (let us say 5C) whereat the user terminal 11 is registered.

As a result of the operation of the terrestrial system 1, the subscriber 13 is directly connected, via the subscriber's gateway 3, for two way voice communication, as indicated by the arrow 17, to the relevant Mobile satellite switching centre 5C, whereon the user terminal 11 happens to be registered as a "Visitor Location"

Now, so far, everything, as described, is perfectly normal, so far as the terrestrial system 1 is concerned. A subscriber 13 has gone through their related gateway 3 to access another gateway 5C for establishment of two way communications. From now on, things become a little more complicated because the user terminal 11 happens to be connected via an earth station 7C whereat the connection via the relevant satellite 9A–C is a transient possibility and whereat the possibility of any form of satellite connection between the user terminal 11 and the earth station 7C whereat the visitor location information 17C happens to be stored is, at best, uncertain. At any moment, the earth station 5A–C could change from the visitor location earth station 5C to one of the others 5A 5B 5D 5E. This is because satellites are constantly changing their position with respect to the user terminal 11 and with respect to the earth stations 5A–E. Conditions can change, making the location of the best positioned earth station 7A–E a matter of some uncertainty.

Each of the earth stations 7A–E is linked to every other earth station 7A–E by a low capacity digital link 19 capable of passing instructions and responses between the earth stations 7A–E but of insufficient capacity to carry voice signals.

Each Mobile satellite switching centre 5A–E is linked, via the terrestrial network 1, to every other Mobile satellite switching centre 5A–E by a voice link 21 capable of two way voice grade communication.

The digital link 19 is a simple packet network and it is envisaged that this can be a permanent connection. Alternatively, it can consist in leased or borrowed time slots in systems comprising part of the terrestrial system.

The voice link 21 is an expensive item to create and to run. It is to be recalled that the earth stations 7A–E may be many thousands of kilometers apart and more than likely separated by oceans. Thus, the associated Mobile satellite switching centre s 5A–5E are similarly separated. While it is within the scope of the present invention that the voice link 21 can be a permanent, dedicated voice grade channel or channels, it is preferred that the voice link 21 is a line, already existing within the terrestrial network and which can be called upon when required. For example, when one Mobile satellite switching centre 5C wishes to call another 5E, being itself a gateway, the one Mobile satellite switching centre 5C simply places a call through the terrestrial system 1 to the other 5E and establishes the voice link 21 that way. This example is not intended to be restrictive, and those, skilled in the art, will be aware of numerous other ways in which the voice link 21 can be created.

Figure 2:
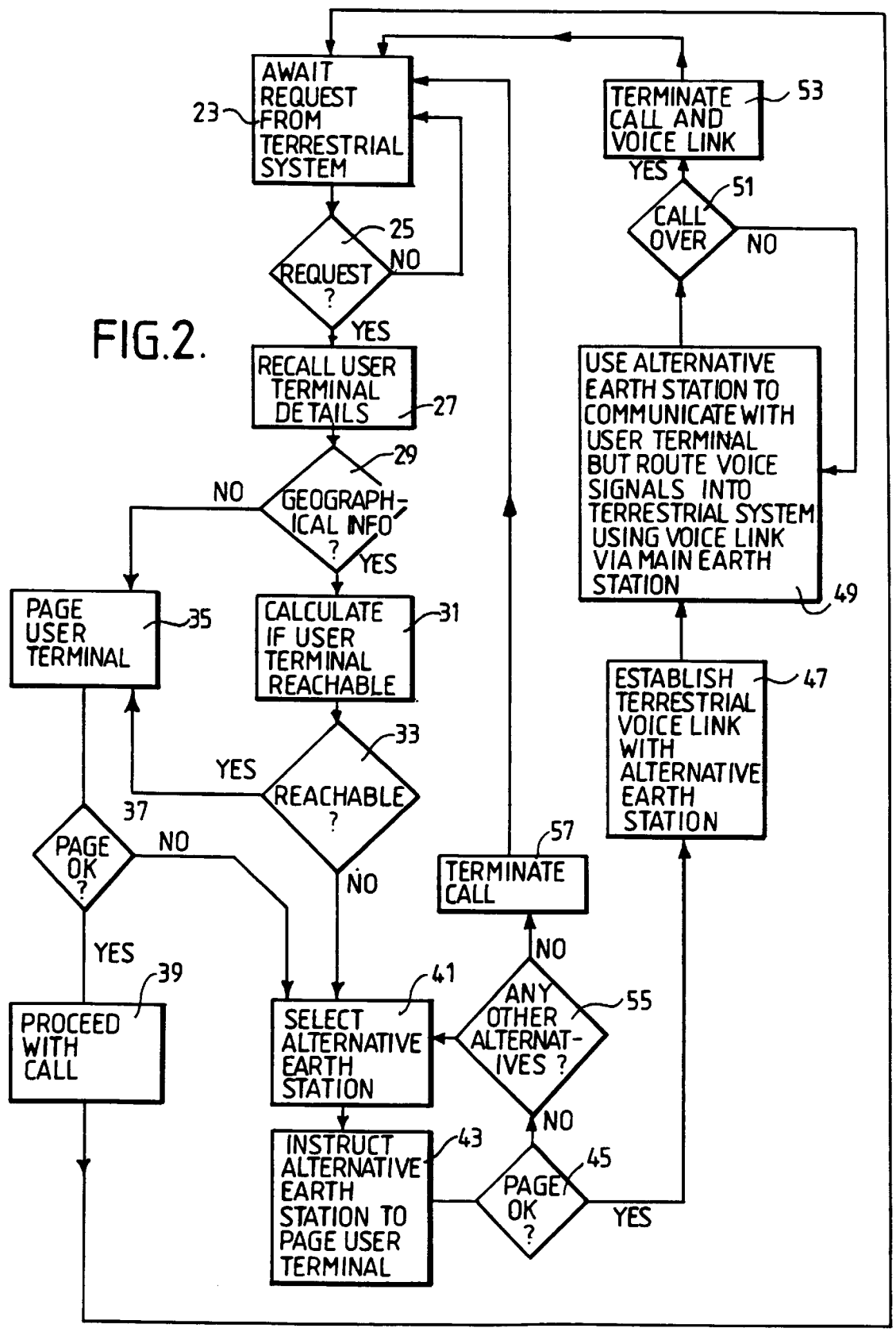
FIG. 2 is a flow chart of the activities of the mobile satellite switching centres of FIG. 1 when establishing a call from the terrestrial network to the user terminal.

FIG. 2 is a flowchart of the activities of the Mobile satellite switching centre (chosen in this instance, per FIG. 1, to be 5C) whereat the user terminal 11 has been registered as a visitor location (17C).

A first activity 23 awaits a request from the terrestrial system 1 until a first test 25 detects such a request, whereupon control is passed to a second activity 27 which recalls the details of the particular user terminal it is desired to access from the visitor location register 17C and its associated memories.

A second test 29 checks the associated data to see if a geographical location is stored. This data, as was earlier described, is derived from a prior knowledge of the position of the satellites 9A–C, Doppler frequency shift measurements and measurement of signal path delays to determine the location of the user terminal to within some 50 kilometers on the surface of the earth. If such a location is stored, control is passed to a third activity 31 where it is calculated whether or not, given the instant disposition of the satellites 9A–E, the user terminal 11 can contact the earth station 7C whereat it is registered as a visitor from its last recorded location. If a third test 33 confirms that the user terminal 11 can, at that instant, be reached, control is passed to an fourth activity 35 which causes the user terminal 11 to be paged. If the user terminal 11 is successfully paged, a fourth test 37 passes control to a twelfth activity 39 which allows the all to the user terminal 11 to proceed and passes control back to the first activity 23 on call completion.

If the second test 29 detected no geographical details, it is still a fair bet that the particular earth station 7C whereat the user terminal 11 is listed as a visitor is the most likely earth station 7C to reach it. Accordingly, the second test 29, if no geographical data is available, passes control to the fourth activity 35 which pages the user terminal in any event and proceeds with the call if successful.

If the attempt to page the user terminal 11 has failed, or if the user terminal 11 has been deemed unreachable by the third test 33, control is passed to a sixth activity 41 which, according to rules hereinafter described, selects an alternative earth station 7A–E. Control is then passed to a seventh activity 43 which causes the alternative earth station, as signalled via the digital link 19, to page the user terminal 11. If a fifth test 45 detects that the attempted user terminal 11 paging has been successful, control is passed to an eighth activity 47 which establishes the voice data link 21 between the mobile satellite switching centre 5C whereat the user terminal 11 is registered as a visitor and the selected alternative earth station 5A–E. Thereafter, control is passed to a ninth activity 49 which uses the alternative earth station 7A–E as the means for contacting the user terminal 11 while routing the voice messages via the voice link 21 back and forward from the mobile satellite switching centre 5C whereat the user terminal 11 is registered as a visitor and employing the mobile satellite switching centre 5C whereat the user terminal 11 is registered as a visitor as the sole gateway 3, 5A–E into the terrestrial system 1.

A sixth test 51 monitors the ninth activity 49 to determine if the call is over. If the call is not over, control rests with the ninth activity 49. If the call is over, control is passed to a tenth activity 53 which terminates the call, suspends the voice link 21 and passes control back to the first activity 23 where the mobile satellite switching centre 5C whereat the user terminal 11 is registered as a visitor, once again, monitors the terrestrial system 1 looking for a request.

If the fifth test 45 does not detect a successful paging of the user terminal 11 from the selected alternative earth station 7A–E, control is passed to a seventh test 55 which looks to see if any other alternative earth station or stations 7A–E might be available under the rules hereinafter described. If an alternative earth station 7A–E exists, control is passed back to the sixth activity 41 for another alternative earth station 7A–E to attempt to page the user terminal 11. If the seventh test 55 fails to detect another alternative earth station 7A–E, control is passed to an eleventh activity 57 which terminates the call and passes control back to the first activity 23 where the mobile satellite switching centre 5C whereat the user terminal 11 is registered as a visitor once again awaits a request from the terrestrial system 1.

The sixth activity 41 behaves, as hereinbefore mentioned, according to a set of rules whereby alternative earth stations 7A–E are selected to page the user terminal 11. There are three possible sets of rules.

In the first two sets of rules, the mobile satellite switching centre 5C at the second earth station 7C, whereat the user terminal 11 is registered as a visitor, uses the digital link 19 to instruct other earth stations 7C, in the geographic vicinity of where the user terminal 11 was believed to be, or simply surrounding the second earth station 7C, to see if a successful page could be executed. If a page succeeds, the contact is made via the other earth station 7A–E as described above. If a successful page is not possible, the call is terminated.

As an example of the first set of rules, where earth stations 7A–E in the putative vicinity of the user terminal are employed, if a user terminal 11 is believed to be somewhere in the Caribbean, but cannot be paged from a North American earth station 7 where its visitor location is stored, because of its location the user terminal might be accessible from earth stations 7 in South America or Africa. Accordingly, the North American earth station 7 causes the African and South American earth stations 7 to attempt to page the user terminal 11.

As an example of the second set of rules, where the probable location of the user terminal 11 is geographically surrounded, if no information is available concerning the likely location of the user terminal 11, its visitor location earth station 7 in North America commands not only the South American and African earth stations 7 to attempt to page the user terminal 11, but also in Europe, the Pacific Rim and the polar region. In this way the earth station 7, whereat the user terminal 11 has its visitor location, does its best to complete the ring around itself so that, no matter in which direction the user terminal 11 may have escaped, it can be found.

In a third possible set of rules, herinbefore undescribed, the mobile satellite switching centre 5C, whereat the user terminal 11 is registered as a visitor, instead of simply taking the last known geographical location of the user terminal 11, instead takes the times and locations of the user terminal 11 on a previous plurality of accesses to calculate and plot, for example, a speed and direction for the user terminal 11 which would be of great utility if the user terminal were on a rapidly moving transport such as a jet aircraft or a low orbiting spacecraft. An estimate of the present location can then be made when calculating whether or not the user terminal 11 is accessible and the appropriate earth station 7, closest to the estimated location, instructed to page the user terminal 11.

So far, the description of the system has centred upon the manner in which the terrestrial system 1 can contact the user terminal 11. The following description relates to the manner in which the user terminal 11 can contact the terrestrial system 1, and contains the subject matter which relates to the present invention.

Figure 3:
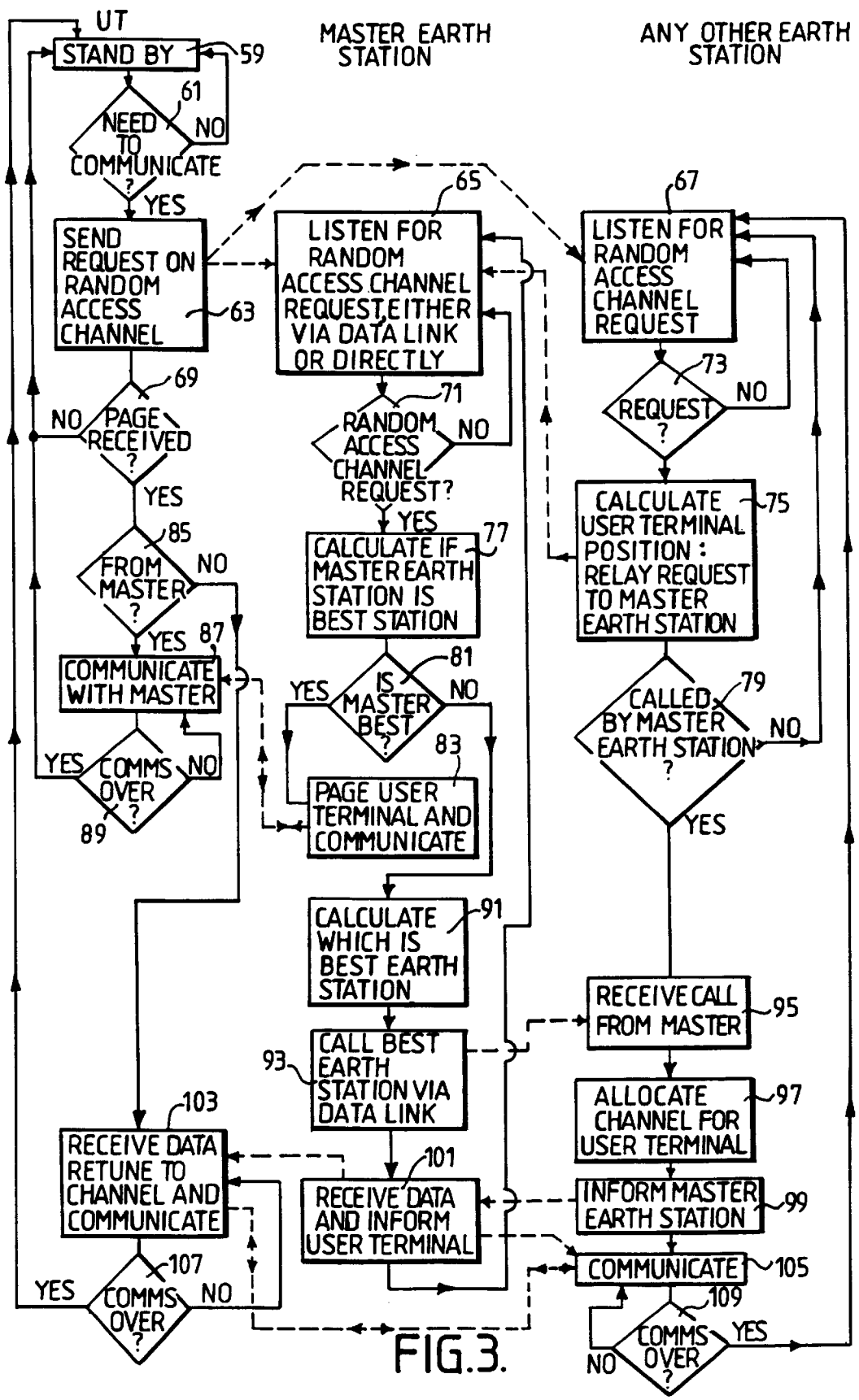
FIG. 3 is a flow chart of the combined activities of the user terminal, a master earth station and all other earth stations, as shown in FIG. 1 when establishing a call from a user terminal into the terrestrial network.

Attention is drawn to FIG. 3 which is a composite flow chart of the concurrent and co-operative activities of the user terminal 11, a master earth station 5A–E, and any other earth station 5A–E, in the process of establishing and executing a call, originating from the user terminal 11 and directed into the terrestrial network 1.

In FIG. 3 there are three parallel flow charts with interactive tests and activities linked to show the sequence of events. Links, made in dotted line, illustrate messages passed either by the digital link 19 or by the use of radio.

The left-hand flowchart shows the activities of the user terminal 11. The central flowchart shows the activities of the mobile satellite switching centre 5A–E at that earth station 7A–E which is designated the master earth station 7A–E, whose significance is later to be explained. The right-hand flowchart shows the activities of the mobile satellite switching centres 5A–E at all of the other earth stations.

It is to be recollected, with reference to FIG. 1, that all of the earth stations 7A–E are linked by a low capacity digital link 19 capable of transferring instructions and data, but not voice messages, between the earth stations 7A–E and their associated mobile satellite switching centres 5A–E. One of the mobile satellite switching centres (let us, for the sake of example, nominate 5A) is designated the master mobile satellite switching centre 5A and the other mobile satellite switching centres 5B–E are "the others" whose activity is described in the right-hand flowchart.

Also recollect that, as previously described, the user terminal 11 has a mobile satellite switching centre 5C whereat it is registered as a user.

Again with reference to FIG. 1, the mobile satellite switching centre 5A, attached to the master earth station 7A, has, additionally to any of the other earth station 7B–E mobile satellite switching centres 5B–E, a controller 18 whose role is to turn this earth station 7A into the master earth station 7A whose behaviour differs from that of the other earth stations 7B–E in a manner which will become clear with reference to FIG. 3 and to its associated description. By being attached to the master earth station 7A, the controller 18 has access to all of the other earth stations 7B–E via the digital link 19 and has direct access to the master earth station 7A. It will become clear, from the following description, that whenever the master earth station is referred to, in fact it is the controller 18 which is the guiding component and, in a sense, the master earth station 7A is just any earth station 7A–E, except that its mobile satellite switching centre 5A happens to be connected directly to the controller 18. It will become apparent, to those skilled in the art, that the controller 18, within the terms of the present invention, merely requires to have digital connection, either via the digital link or directly, to each of the earth stations 7A–E.

It is important to realise that each satellite 9A–C has a random access channel through which any user terminal 11 can call. This is a common frequency to all of the satellites 9A–C and any message they receive is relayed directly to all of the earth stations 7A–E which can hear the satellites 9A–C which, in turn, can hear the user terminal 11.

Refering to FIG. 3, in a twelfth activity 59 the user terminal 11 stands by until it is required for use. An eighth test 61 maintains the standby of the 12th activity 59 if there is no need for the user terminal 11 to communicate, and transfers control to a thirteenth activity 63 if communication is required.

The thirteen activity 63 causes the user terminal 11 to send out a radio message request for service on the random access channel. This message can be picked up by all satellites within range and relayed to their associated, current earth stations 7A–E.

In the meantime, in a fourteenth activity 65, the master earth station 5A has been monitoring both the down signals from the satellites 9A–C for a request on the random access channel and has also been monitoring the digital link 19 for indication, from any of the other earth stations 7B–E, that any of them may have received a request on the random access channel.

Again, in the meantime, in a fifteenth activity 67, the other earth stations 7B–E have been monitoring the random access radio channel to see if a request is received from any user terminal 11.

When the user terminal 11, under control of the thirteenth activity 63, sends out a radio request on the random access channel, it is received either by no earth station (in which case there is no response whatsoever), by one earth station, which may or may not be the master earth station 5A, or by several earth stations 7A–E, which, again, may or may not include the master earth station 5A.

The user terminal 11, having sent out a request on the random access channel, uses a ninth test 69 to see if a page has been received from any source. If no page has been received within a predetermined time, control is passed back to the twelfth activity 59 where the user terminal 11 stands by and, if still required, can proceed to send another request on the random access channel.

Meanwhile, the master earth station 7A employs a tenth test 71 and the other earth stations 7B–E employ an eleventh test 73 to determine whether or not an attempted access on the random access channel has been received from the user terminal 11.

For the sake of this example, it will be assumed that request on the random access channel has been received both by the master earth station 7A and by several of the other earth stations 7B–E.

It is a characteristic of a request, on the random access channel, that a measurement of Doppler shift, a knowledge of instant satellite position and measurement of path delays allows a fairly accurate estimation to be made of the position of the user terminal 11 on the surface of the earth. Each of the earth stations 7A–E, including the master earth station 7A, makes such an estimation of the position of the user terminal 11 whenever a request is received on the random access channel.

The other earth stations 7B–E, when the eleventh test 73 detects a request on the random access channel, received via a satellite 9A–C, pass control to a sixteenth activity 75 which calculates the position of the user terminal 11, and uses the data link 19 to signal to the master earth station 7A firstly, that the particular other earth station 7B–E has received a request on the random access channel, secondly, the calculated position of the user terminal, and thirdly, the identity of the user terminal 11.

It may or may not be that the master earth station 7A has received a request on the random access channel. Nonetheless, if any of the other earth stations 7B–E has received a request, the master earth station 7A receives notification via the data link 19 and, in either circumstance, having itself calculated the position of the user terminal 11, in the event that the master earth station 7A received a request on the random access channel, the tenth test 71 passes control to a seventeenth activity 77 where the master earth station 7A calculates which earth station 7A–E is best placed to service the request from the user terminal 11.

Meanwhile, each of the other earth stations 7B–E which received a request on the random access channel has moved on to a twelfth test 79 where, if the master earth station 7A has not called the other earth station 7B–E within another predetermined time, control is passed back to the fifteenth activity 67 where the other earth station 7B–E returns to listening for requests on the random access channel.

The seventeenth activity 77 in the master earth station 7A is monitored by a thirteenth test 81 to see if the calculations of the seventeenth activity 77 have deemed the master earth station 7A itself to be best earth station 7A–E to service the request from the user terminal 11. If the master earth station 7A proves to be best placed to service the request from the user terminal 11, control is passed to an eighteenth activity 83 which causes the master earth station 7A to page the user terminal 11, allocate a voice channel for voice communications with the user terminal 11, inform the user terminal 11 of the frequency of the voice channel, the user terminal 11 re-tuning to the voice channel, and communicate with the user terminal on the allocated voice channel. In the meantime, the ninth test 69 in the user terminal 11 having detected the page, and the user terminal 11 having detected the origin of the page as the master earth station 7A via a fourteenth test 85, control is passed to a nineteenth activity 87 where the user terminal 11 co-operates with the eighteenth activity 83 of the master earth station 7A to receive details of the allocated voice channel from the master earth station, to retune to the frequency of the allocated voice channel, and to exchange voice communications with the master earth station 7A in the course of a telephone call. When a fifteenth test 89 in the user terminal detects that voice communications are finished, control is returned to the twelfth activity 59 where the user terminal is once more on standby. In the same way, but not shown on the flow chart for the master earth station 7A, when the eighteenth activity 83 terminates voice communication with the user terminal 11, control is passed back to the fourteenth activity 65 where the master earth station 7A once again listens for requests on the random access channel, either directly from the user terminal or reported through the other earth stations 7B–E via the data link 19.

If the thirteenth test 81 detects that the master earth station 7A is not the best placed to service the request, received from the user terminal 11 on the random access channel, control is passed to a twentieth activity 91 where the master earth station 7A calculates, from geographical knowledge concerning each of the other earth stations 7B–E, and from a knowledge of the orbits and positions of satellites 9A–C, combined with a knowledge of the position of the user terminal 11, just which one of the other earth stations 7B–E is the best placed to service the request from the user terminal 11. Control is then passed to a twenty-first activity 93 where the master earth station 7A uses the data link to instruct the best other earth station 7B–E to initiate contact with the user terminal 11.

The other earth stations 7B–E, when the twelfth test 79 detects that they have been called by the master earth station 7A, pass control to a twenty-second activity 95.

It is to be noted that only one (the best placed other earth station, let us say, for the sake of this example, 7B) of the other earth stations 7B–E will receive a call from the twenty-first activity 93 of the master earth station 7A. All of the residual earth stations 7C–E will drop out as the twelfth test 79 fails to detect a call from the master earth station 7A within the allotted time and each residual earth station 7C–E reverts to the fifteenth activity 67 where it once again listen for requests on the random access channel.

The twenty-second activity 95 of the best placed other earth station 7B receives and acknowledges the call from the master earth station 7A, generated by the twenty-first activity 93 of the master earth station 7A and sent via the data link 19. The best placed other earth station 7B next passes control to a twenty-third activity 97 where the best placed other earth station 7B, referring to the exact location of the user terminal 11 with reference to the beam pattern of its antennae and the frequency allocations within each earthward-looking beam, selects an appropriate beam and allocates a voice communication frequency for the user terminal 11 to use.

The best placed other earth station 7B then passes control to a twenty-fourth activity 99 where the best placed other earth station 7B uses the data link 19 to signal the master earth station 7A to inform the master earth station 7A what frequency has been allocated for use by the user terminal 11 and pages the user terminal 11. Meanwhile the master earth station 7A has passed control from the twenty-first activity 93 to a twenty-fifth activity 101 where the master earth station 7A receives the allocated frequency information from the best placed other earth station 7B.

The fourth activity 99 of the best placed other earth station 7B, in paging the user terminal 11, causes the combination of the ninth test 69 and the fourteenth test 85 to pass control to a twenty sixth activity 103 where the user terminal 11 is receptive to the data relating to the allocated frequency which the best placed other earth station 7B will use for voice communication.

The twenty-fifth activity 101 can then do one of two things. If the request on the random access channel was heard by the master earth station 7A, the master earth station itself responds to inform the user terminal 11 and the twenty-sixth activity of the user terminal 11 receives the allocated voice channel frequency information via the radio link of the master earth station 7A. If, however, the master earth station 7A did not receive the request on the random access channel via radio communication with the user terminal 11, the master earth station 7A uses the data link 19 to instruct a twenty-seventh activity 105 in the best placed other earth station 7B to transmit the allocated frequency of the voice channel to the user terminal 11.

In any event, one way or the other, the user terminal 11 receives, via its twenty-sixth activity 103, the frequency of the allocated voice channel. The twenty-sixth activity 103 of the user terminal 11 causes the user terminal to retune to the frequency of the allocated voice channel and to commence voice communications through the best placed other earth station 7B. The best placed other earth station 7B responds by its twenty-seventh activity 105 to reciprocate the voice communications with the user terminal 11. A sixteenth test 107 monitors the twenty sixth activity 103 of the user terminal 11 and, when voice communications are finished, returns the user terminal 11 to the twelfth activity 59 where the user terminal 11 is on standby. Likewise, a seventeenth test 109 monitors the twenty-seventh activity 105 of the best placed other earth station 7B and, when the voice communication with the user terminal 11 is ended, returns the best placed other earth station 7B to the fifteenth activity 67 where the best placed other earth station 7B reverts to listening for further requests on the random access channel.

Figure 4:
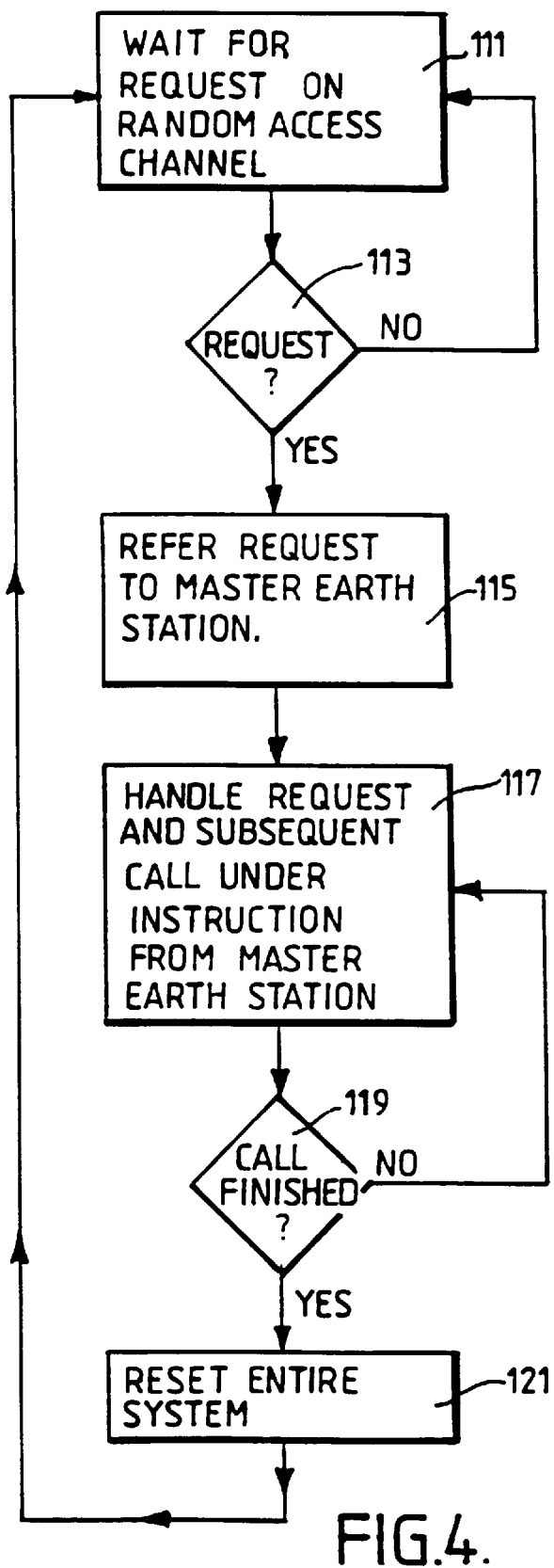
FIG. 4 is a flow chart summarising the flow chart and associated description of FIG. 3.

FIG. 4 is an explanatory flow chart of the way in which the overall system reacts to a request, from the user terminal 11, on the random access channel.

The "air interface" system of earth stations 7A–E and their associated mobile satellite switching centres 5A–E, which control the earth stations 7A–E, (which are the operative elements, collectively, between the ground, whether it be a user terminal 11 or the terrestrial system 1, and the satellite radio connection for the user terminal 11) starts out in one state and reverts back to it at the end of servicing a request over the random access channel.

Summarising the description of FIG. 3, a twenty-eighth activity 111, equivalent to the fourteenth activity 65 together with the fifteenth activity 67 of FIG. 3, waits to hear a request on the random access channel. An eighteenth test 113, on receipt of a request, refers the request directly to the master earth station 7A in a twenty-ninth activity 115 which allocates resources to service the request in a thirtieth activity 117 including setting up and executing a telephone call through the best other earth station 7B. When a nineteenth test 119 detects that the telephone call is terminated, a thirty-first activity 121 resets all of the user terminal 11 and the earth stations 7A–E so that, on the next request on the random access channel, the entire procedure starts again, unaltered.

Thus, all of the earth stations 7A–E and the user terminal 11 commence with their relevant initial activities 59, 65, 67 and revert back to them. The overall state of the system 7A, 7B–E, 11 is unchanged by the act of request and subsequent voice communication.

In a sense, the entire "air interface" system acts like a star or a wheel with spokes. Wherever the request is received from the user terminal 11 on the random access channel, reference is immediately made back to the centre of distribution, the master earth station 7A. The master earth station 7A then allocates resources, as from the centre of radiation of a star or from the hub of a wheel. Every time a new request is made, the ray of the star or the spoke of the wheel can change. At the end of operations servicing the request, the system collapses to the star or the hub of the wheel, only to start all over again when a new request is received.

It is to be recollected, with reference to FIGS. 1 and 2, that the user terminal 11 is registered, as a visitor, at one of the earth stations 5C, which acts as its gateway 3 into the terrestrial system 1. It is also to be recollected, in connection with the earlier description, that the terrestrial system 1 can tolerate only one entry gateway and one exit gateway. The communication, by the user terminal 11, as described with reference to FIGS. 3 and 4, must also comply with this requirement. In the best case, the master earth station, the best placed earth station, and the gateway earth station whereat the user terminal 11 is registered as a visitor are one and the same. Generally, it is very unlikely that the master earth station 7A is the gateway earth station, since only one earth station, world-wide, is designated the master earth station 7A and the user terminal 11 can be anywhere on the surface of the earth and will, at some point, have registered with an earth station 7A–E. Under these circumstances, the next best situation occurs where the best placed earth station 7B is also the gateway earth station 7A–E whereat the user terminal 11 is registered as a visitor, so that the gateway problem does not arise. However, for the purpose of explanation of operation of the entire system, the examples, here chosen, are at variance with these best cases. It is understood, from the previous description, that, in the worst instance, the master earth station 7A is not the same as the best placed earth station 7B, which, again, is not the same as the gateway earth station 5C 7C whereat the user terminal 11 is registered as a visitor. Despite the disparity between the up to three earth stations 7A–E involved, it is still necessary to present, to the terrestrial system 1, a situation where there is only one gateway 5C earth station providing connection with the terrestrial system 1.

Referring, again, to FIGS. 1 and 3, under this extreme circumstance, the master earth station 5A has used the digital link 19 to instruct the best placed earth station 5B to conduct the voice dialogue constituting a telephone call between itself and the user terminal 11 while all along the terrestrial system 1 regards the gateway earth station 5C as the one and only interface for the user terminal 11 into and out of the terrestrial system 1.

When the master earth station 7A, in the eighteenth activity 83 of FIG. 3, communicates with the user terminal 11, in fact the master earth station 7A has a connection established, on the voice link 21, between its mobile satellite switching centre 5A and the mobile satellite switching centre 5C at the gateway earth station 7C. The gateway earth station 5C 7C passes all of the voice messages to and from the master earth station 7A out of and into the terrestrial system 1.

Similarly, when the best placed other earth station 7B, in the twenty-seventh activity 105 of FIG. 3, communicates with the user terminal 11, in fact the best placed other earth station 7C has a connection established, on the voice link 21, between it and the gateway earth station 5C. The gateway earth station 5C 7C passes all of the voice messages to and from the best placed earth station 7B out of and into the terrestrial system 1.

It is necessary to establish which of the earth stations is the gateway earth station whereat the user terminal is registered. Potentially, each user terminal 11 can be registered at any one of the earth stations 7A–E.

Figure 5:
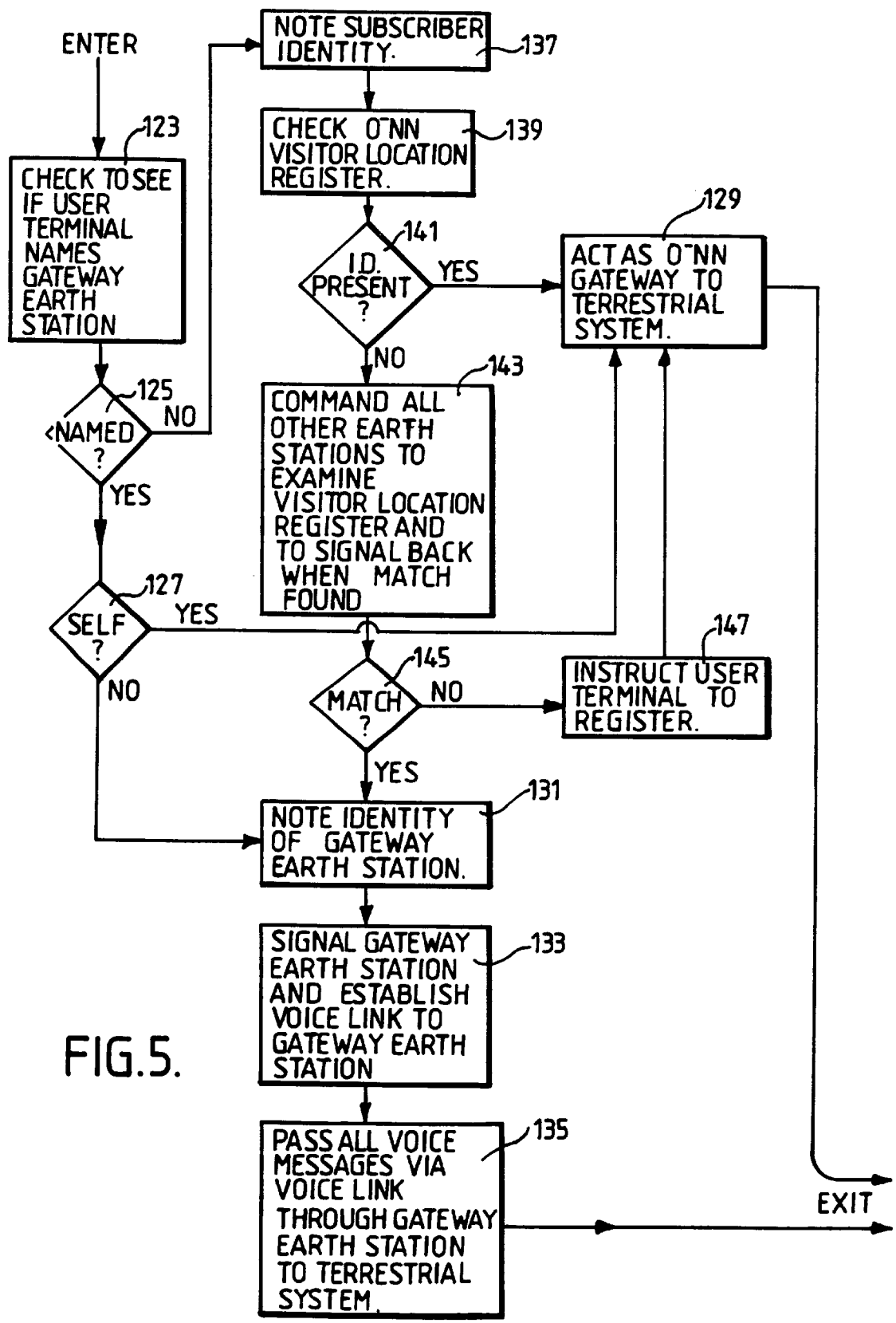
FIG. 5 is a flow chart showing how the mobile satellite switching centres of FIG. 1 route calls into the terrestrial system when establishing a call from a user terminal according to the flow charts of FIGS. 3 and 4.

FIG. 5 is a flowchart of the behaviour of the earth stations 5A–E 7A–E when executing voice communication with the user terminal. It represents, in greater detail, the communication element of the eighteenth activity 83 of the master earth station 7A in FIG. 3. It also represents, in greater detail, the communication element of the twenty seventh activity 105 of the best placed other earth station 7B of FIG. 3.

The communication element is entered via a thirty-second activity 123 which checks if the user terminal 11 has, during the course of its request on the random access channel, or during being paged, passed on any indication as to at which of the earth stations 7A–E it happens to be registered as a visitor. In the embodiment of the present invention, it is envisaged that the user terminal 11, when it registers at an earth station 7A–E, retains a record which it can send during a random access request and/or when it is paged. This constitutes a great time saving to the overall system since there is no need to expend time, resources and effort to discover where the user terminal 11 might be registered.

A twentieth test 125 checks to see if the user terminal 11 has, indeed, named that earth station 5C where it happens to be registered as a visitor. If the user terminal 11 has named the gateway terminal 5C where it happens to be registered, a twenty-first test 127 checks to see if the identified earth station 7A–E happens to be the same one that is in communication. If this is the case, then either the master earth station 7A or the best other earth station 7B is the gateway earth station and control is passed to a thirty-third activity 129 where the earth station acts as its own gateway into the terrestrial system 1 and exits the communication element when voice communication with the user terminal 11 is complete.

If the twenty-first test 127 does not identify the gateway earth station 7C as the same earth station 7A–E which is currently required to be engaged in voice communication with the user terminal 11, control is passed to a thirty-fourth activity 131 which notes the identity of the earth station 7A–E whereat the user terminal 11 is actually registered as a visitor. Control is then passed to a thirty-fifth activity 133 where the earth station engaged in communication with the user terminal 11 sends a signal via the digital link 19 to the earth station 5C whereat the user terminal 11 is registered, and co-operates therewith to establish a voice grade link therebetween using the voice link 21. Having established the necessary hardware configuration, control is passed to a thirty-sixth activity 135 where the earth station 7A or 7B, actually in radio contact with the user terminal 11, passes all voice messages via the voice link 21 to the earth station 7C whereat the user terminal 11 is registered as a visitor, which, in turn, provides two-way voice communication with the terrestrial system 1. When communication with the user terminal 11 is finished, the thirty-sixth activity 135 provides an exit from the communication routine, having disestablished the voice link 21 with the earth station 7C whereat the user terminal 11 is registered as a visitor.

If the twentieth test 125 failed to detect the user terminal 11 naming an earth station 7A–E as its site of visitor registration, control is passed to a thirty-seventh activity 137 which notes the identity of the subscriber. Each user terminal comes with a subscriber identity module (popularly known as a SIM), commonly provided in the form of a smartcard having a microprocessor and which can be inserted into the user terminal, which, among other things, provides a unique identity for the user terminal. This identity is transmitted during the request on the random access channel and in response to a paging operation.

Having learned the unique identity of the user terminal 11, control is passed to a thirty-eighth activity 139 where the particular earth station, actually in radio contact with the user terminal 11, checks its own visitor location register 17A–E to see if the user terminal 11 is registered at that earth station 7A–E. If a twenty-second test 141 discovers that the user terminal 11 is, indeed, registered at that earth station 7A–E, control is passed to the thirty-third activity where the earth station 7A–E itself acts a gateway into the terrestrial system and exits the communication routine when voice grade communication with the user terminal 11 is finished.

If the twenty-second test 141 fails to discover the user terminal's 11 unique identity stored in the visitor location register 17A–E of the earth station 7A–E which is in actual radio contact with the user terminal, control is passed to a thirty-ninth activity where the earth station 7A–E commands all of the other earth stations 7A–E, using the digital link 19, to examine their visitor location registers 17A–E and to report back if a match is found.

If a twenty-third test 145 notes that one of the other earth stations 7A–E has responded affirmatively, control is passed to the thirty-fourth activity 131 whose actions and consequential control exchanges have been described above.

If the twenty-third test 145 fails to detect a response from any of the earth stations 7A–E, this indicates that the user terminal 11, for whatever reason, is registered nowhere. Accordingly, control is passed to a fortieth activity 147 where the user terminal 11 is registered with the actual earth station 7A–E with which it is in radio contact and, in turn, if the feature is incorporated, the user terminal notes the identity of the earth station 7A–E with which it is in radio contact so that later attempts, by the user terminal 11 to make a request, on the random access channel, will be accompanied by indication of at which earth station 7A–E the user terminal 11 is registered.

An unregistered user terminal 11 is aptly registered at the earth station with which it is in actual radio contact since it is assured that the earth station 7A–E and the user terminal 11 can hear one another.

The fortieth activity 147 passes control to the thirty-third activity 129 where the earth station, now being the site of registration of the user terminal 11, acts as its own gateway into the terrestrial system 1 and provides an exit from the communication routine when voice communications with the user terminal 11 are terminated.

It is to be appreciated that the master earth station 7A is simply an earth station whose mobile satellite switching centre 5A is modified to behave differently from the mobile satellite switching centres 5B–E of the other earth stations 7A–E. The role of the master earth station 7A is simply supervisory over the other earth stations. To that end, those skilled in the art will be aware that no particular earth station 7A–E needs to be designated the master earth station 7A, it simply being necessary that, somewhere, in communication with the earth stations 7A–E, there exists a supervisory controller capable of executing the actions hereinbefore described.

What is claimed is:

1. A satellite communication system comprising:
   a plurality of satellites;
   a user terminal comprising a transmitter to transmit a request for service;
   a plurality of earth stations each including:
      a receiver to receive the request for service from said user terminal via one of said plurality of satellites; and
      a switch to provide a gateway for call traffic between the user terminal and a terrestrial network; and
   a controller for selecting an earth station from said plurality of earth stations to service said request for service from the user terminal,
   wherein each earth station is configured to be responsive to reception of a request for service from said user terminal to calculate the position of said user terminal and signal said request for service with said calculated position to said controller, and said controller is configured to perform said selection of said earth station based on said signaled calculated position of said user terminal.

2. A satellite communication system according to claim 1 wherein said controller is operable to calculate the position of said user terminal and is operative to select said best placed earth station on the basis of the position of the user terminal, the instant and future positions of the satellites, and the positions of the earth stations.

3. A satellite communication system according to claim 1 wherein said user terminal is operative to request service on a random access channel and wherein each of said earth stations is operable to respond to a request for service on said random access channel.

4. A satellite communication system according to claim 1, wherein said best placed earth station is operable, in response to instruction from said controller, to allocate a frequency for a communication channel for use by said user terminal.

5. A satellite communication system according to claim 4 wherein said controller is operable to instruct said best placed earth station to inform said user terminal of the frequency of said allocated communication channel and wherein said user terminal is operative, in response to said being informed by said best placed earth station to retune to said frequency of said allocated communication channel to communicate with said best placed earth station.

6. A satellite communication system, according to claim 1 wherein said user terminal is operable to store the identity of that earth station whereat said user terminal was last registered, and wherein said user terminal is operative to convey said identity to said controller.

7. A satellite communication system according to claim 1 of wherein said controller is operable to command each of said earth stations to inspect the contents of a respective visitor location register to determine whether or not said user terminal is registered thereon, and to signal back to said controller whether or not said user terminal is registered.

8. A satellite communication system, according to claim 7 wherein, when said user terminal is registered at one of said earth stations as a gateway station into a terrestrial telephone system, in the event that said best placed earth station is not said gateway station, said controller is operable to instruct said best placed earth station to relay all voice messages to and from said terrestrial system via said gateway earth station.

9. A satellite communication system according to claim 1 wherein, when said user terminal is not registered at any of said earth stations as a gateway earth station, said controller is operable to instruct said best placed earth station to become the registered gateway earth station for said user terminal.

10. A satellite communication system according to claim 8 wherein said relaying of messages between said gateway earth station and said best placed earth station is accomplished using a voice grade link.

11. A satellite communication system, according to claim 1 wherein said instructions and data are conveyed between said controller and said earth stations, and between said earth stations, using a low capacity digital link.

12. A satellite communication system, according to claim 1 wherein said controller is combined with one out of said plurality of earth stations to provide a master earth station.

13. A method for use in a satellite communication system where a user terminal is operable to communicate with a plurality of satellites; where each of said plurality of satellites is operable to communicate with each of a plurality of earth stations; where said user terminal is operable to communicate through said plurality of satellites to request service; where said plurality of earth stations comprises a controller; said method including: each of said plurality of earth stations monitoring said satellites; each of said plurality of earth stations, in the event of receiving a request for service from said user terminal, calculating the position of said user terminal, providing said calculated position of said user terminal and signaling to said controller, indicatively of having received a request for service from said user terminal and with said calculated position, in response to said receipt of a signal indicative of having received a request for service from said user terminal, instructing the best placed one of said plurality of earth stations to service said request and to provide a gateway for call traffic based on said calculated position of said user terminal.

14. A method according to claim 13 including: said controller calculating the position of said user terminal; and said controller selecting said best placed earth station on the basis of the instant position of the user terminal, the instant and future positions of the satellites, and the positions of the earth stations.

15. A method according to claim 13 including; said user terminal requesting service on a random access channel; and each of said earth stations, in receipt of a request for service from said user terminal responding thereto.

16. A method according to claim 13, including said best placed earth station, in response to instruction from said controller, allocating a frequency for a communication channel for use by said user terminal.

17. A method according to claim 16 including; said controller instructing said best placed earth station to inform said user terminal of the frequency of said allocated communication channel; and said user terminal, in response to said being informed by said best placed earth station of the frequency of said communication channel, retuning to said frequency of said allocated communication channel to communicate with said best placed earth station.

18. A method according to claim 13 including: said user terminal storing the identity of that earth station whereat said user terminal was last registered, and said user terminal conveying said identity to said controller.

19. A method according to claim 13 including said controller commanding each of said earth stations to inspect the contents of a respective visitor location register to determine whether or not said user terminal is registered thereon, and each of said earth stations signalling back to said controller whether or not said user terminal is registered.

20. A method according to claim 19 including said controller, in the event of said user terminal being registered at one of said earth stations as a gateway station into a terrestrial telephone system, and in the event that said best placed earth station is not said gateway station, instructing said best placed earth station to relay all voice messages to and from said terrestrial system via said gateway earth station.

21. A method according to claim 13 including said controller, in the event that said user terminal is not registered at any of said earth stations as a gateway earth station, instructing said best placed earth station to become the registered gateway earth station for said user terminal.

22. A method according to claim 20 including employing a voice link to relay said messages between said gateway earth station and said best placed earth station.

23. A method according to claim 13 including conveying said instructions between said controller and said earth stations, and between said earth stations, using a low capacity digital link.

24. A method, according to claim 13, including incorporating said controller with one out of said plurality of earth stations to provide a master earth station.

25. A user terminal for use in a satellite communication system where said user terminal is operable to communicate with each of a plurality of satellites; where each of said plurality of satellites is operable to communicate with each of a plurality of earth stations; where said user terminal is operable to communicate through said plurality of satellites to request service; where said plurality of earth stations comprises a controller; where each of said plurality of earth stations is operable to monitor said satellites, and in the event of receiving a request for service from said user terminal, calculating the position of said user terminal and providing said calculated position of said user terminal and signaling said controller, indicatively of having received a request for service from said user terminal, to instruct the best place one out of said plurality of earth stations to service said request based on said calculated position of said user terminal; said user terminal being characterized by being operable to store the identity of that earth station whereat said user terminal was last registered and to convey said identity to said controller and is further operable, in the event of said user terminal not storing an identity, to accept, as said identity, the identity of said best placed earth station.

* * * * *